(12) United States Patent
Marcinko et al.

(10) Patent No.: US 6,878,795 B2
(45) Date of Patent: Apr. 12, 2005

(54) ALTERNATIVE MOISTURE CURE CATALYSTS AND COLD CURING POLYISOCYANATE ADHESIVES PREPARED THEREFROM

(75) Inventors: Joseph J. Marcinko, Mullica Hill, NJ (US); Anthony A. Parker, Newton, PA (US); Herbert R. Gillis, West Deptford, NJ (US)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 10/626,982

(22) Filed: Jul. 25, 2003

(65) Prior Publication Data

US 2005/0020799 A1 Jan. 27, 2005

(51) Int. Cl.⁷ ............................................. C08G 18/18
(52) U.S. Cl. .............................. 528/69; 528/82; 528/53; 560/24; 252/182.2; 428/425.1; 156/331.7
(58) Field of Search ............................... 528/53, 69, 82; 560/24; 252/182.2; 428/425.1; 156/331.7

(56) References Cited

U.S. PATENT DOCUMENTS 3,899,387 A * 8/1975 Freis et al. .................. 162/158
6,368,714 B1    4/2002 Robertson et al.

* cited by examiner

Primary Examiner—Rachel Gorr
(74) Attorney, Agent, or Firm—Nicole Graham

(57) ABSTRACT

Cold curing polyisocyanate adhesive compositions suitable for use in the preparation of engineered lumber composites. Additionally provided are catalysts comprising tertiary amine alkoxylates that are reduced in or substantially free of isocyanate-reactive hydroxylic or amine hydrogen atoms. Further provided is a process for preparing composites articles using the adhesive compositions and composite articles prepared from the adhesive compositions. Composite articles prepared from the adhesive compositions have a substantially increased resistance to delamination.

20 Claims, No Drawings

ALTERNATIVE MOISTURE CURE CATALYSTS AND COLD CURING POLYISOCYANATE ADHESIVES PREPARED THEREFROM

FIELD OF THE INVENTION

The invention relates to adhesive systems, and more particularly to cold cure catalysts for use in polyisocyanate adhesives, polyisocyanate adhesives prepared with such catalysts, a process for preparing adhesive bonded composite articles prepared from such adhesives, and composite articles bonded with such adhesives.

BACKGROUND OF THE INVENTION

The use of organic polyisocyanate adhesives is well known for the production of consolidated wood composites such as chipboard (OSB), fiberboard, and related composite wood products. Polyisocyanate adhesives are also known for use in making engineered lumber composites such as I-beams (I-joists), laminated veneer lumber (LVL), and other types of structural lumber composites. The cure of the polyisocyanate in these end use applications is believed to be facilitated by the moisture present in the wood substrate. In commodity wood composite boards, such as OSB, heated presses are used to accelerate the cure of the polyisocyanate adhesive. Press temperatures exceeding 100° C., and often above 200° C., are used to facilitate rapid cure in these applications. However, in specialized structural (or engineered) lumber applications it is often impractical to use heat to drive the cure of the adhesive because the engineered wood composite structures are too massive for adequate heat transfer. In these highly specialized structural applications, it is more preferred to use polyisocyanate adhesives that cure at ambient temperatures. The formulation of these "cold cure" polyisocyanate adhesives is also well known in the art. The challenge in formulating such resins is to achieve an adequate balance between the need for rapid cure at room temperature and a suitably long working time (or pot life).

It is known in the prior art to use low molecular weight tertiary amine catalysts to promote the moisture activated curing of polyisocyanate adhesives. Unfortunately, the use of these low molecular weight tertiary amine species, even those that are free of active hydrogen groups reactive towards isocyanates, has not proven to be entirely satisfactory because such amines are usually unstable in polyisocyanates of the type used most widely in the wood composites industry and they typically do not provide a long enough open time (working time) to allow for easy handling of the adhesive or adequate time for the assembly of adhesive joints.

Another class of catalyzed polyisocyanate wood adhesive systems suitable for use in one-component moisture curing applications that is described in the prior art includes cold-curing polyisocyanate wood adhesives that comprise isocyanate group terminated prepolymers of amine alkoxylates (see e.g. U.S. Pat. No. 6,368,714). These prepolymer compositions have been found to offer an excellent combination of long working time (long pot life) on wood substrates and good moisture curing characteristics under ambient temperature conditions (cold cure). However, these adhesive systems, when used in laminated lumber applications, have been shown, under cold cure conditions to cause excessive delamination and unsatisfactory performance when tested according to ASTM D-2559-00. It is postulated that the delamination problem may be caused by a slow cure and/or an incomplete cure of the adhesive.

Therefore, there is a strong need for an improved class of polyisocyanate-based cold curing wood adhesives that have both long pot life and excellent stability, while providing increased resistance to delamination, especially when tested according to the procedure of ASTM D-2559-00, which is fully incorporated herein by reference.

SUMMARY OF THE INVENTION

The invention pertains to at least partially blocked derivatives of alkoxylated amines, wherein at least a portion of the organic —OH groups present on the original alkoxylate have been reacted with one or more monofunctional species in such a way as to decrease the ability of the amine alkoxylate to react subsequently with isocyanate groups to form adducts therewith. The preferred alkoxylates are essentially free of isocyanate reactive groups other than organic —OH groups, and contain at least one aliphatic tertiary amine group per molecule on a number averaged basis.

The invention further provides for polyisocyanate adhesive compositions that comprise an at least partially blocked amine alkoxylate (or adducts thereof) and a polyisocyanate. In the more preferred embodiments, the polyisocyanate adhesive compositions are cold curing one-component moisture activated adhesives.

The invention still further provides for a process for producing adhesive bonded wood composites. The process comprises the use of a polyisocyanate adhesive that contains an at least partially blocked amine alkoxylate species.

The invention still further provides for adhesive bonded composite wood articles bonded with the adhesives disclosed herein. In a preferred embodiment, the adhesive-bonded wood composite articles are laminates that exhibit a reduced tendency for delamination. In more preferred embodiments, the adhesive-laminated wood composite articles are characterized by having a total delamination of less than 2%, as measured according to the delamination test procedure of ASTM D-2559-00.

In a preferred embodiment, the monofunctional blocking agent used to achieve an at least partial blocking of the free —OH groups of the alkoxylated amine comprises an organic monoisocyanate. In a more preferred embodiment, at least 30 mole percent of the free organic hydroxyl groups originally present in the alkoxylated amine are blocked with monofunctional blocking agents.

DETAILED DESCRIPTION OF THE INVENTION

The at least partially blocked amine alkoxylates are preferably ethoxylated and/or propoxylated derivatives of ammonia or aliphatic amines that have been blocked by reaction of at least some of the terminal —OH groups with one or more monofunctional blocking agents. The monofunctional blocking agents that may be used for this purpose include any of the known monofunctional reagents capable of reaction with an organic —OH group in such as way as to prevent it from reacting with the isocyanate groups of polyisocyanates. A preferred class of blocking agents are organic monoisocyanates. Aromatic or aliphatic monoisocyanates may be used. Non-limiting examples of suitable monoisocyanate blocking agents include phenyl isocyanate, p-tolyl-isocyanate, o-tolyl isocyanate, methyl isocyanate, ethyl isocyanate, n-butyl isocyanate, n-hexyl isocyanate, isopropyl isocyanate, isobutyl isocyanate, 2-ethyl hexyl isocyanate, n-octyl isocyanate, n-nonyl isocyanate, n-octadecyl isocyanate, benzyl isocyanate, combinations of these, and the like.

Other monofunctional organic compounds that can be used to achieve the at least partial blocking of the terminal organic —OH groups, as present in an amine alkoxylate, include, without limitation, monocarboxylic acids, monocarboxylic acid anhydrides, monocarboxylic acid esters, monocarboxylic acid halides, alkyl halides (especially primary alkyl halides), alkyl methansulfonates (especially primary alkyl methanesulfonates), alkyl toluenesulfonates (especially those of primary alkanes), alkyl benzenesulfonates (especially those of primary alkanes), combinations of these different types of blocking agents, and the like. Other potentially useful blocking agents will be appreciated by those skilled in the art. Any blocking agent which either prevents the reaction of, or reduces the rate of reaction of, the terminal —OH groups present in the original amine alkoxylate with isocyanate groups may be used. Phenyl isocyanate is a particularly preferred blocking agent.

The monofunctional blocking agent reacts with the terminal —OH groups of the amine alkoxylate, or at least a portion of the —OH groups, to form covalent bonded structures such as urethane, ester, or ether linkages. By the term "monofunctional" it is meant that the blocking agent molecule is itself free of isocyanate reactive active hydrogen atoms, and further that it reacts with only one of the organic —OH groups present in the original (underivatized) amine alkoxylate molecule.

Although not wishing to be bound by any theory, it is suspected that the at least partial blocking of the free —OH groups present in the amine alkoxylate has the effect of increasing the mobility, and, thus, the catalytic availability of the tertiary amine groups present in the amine alkoxylate during the cure of the moisture activated polyisocyanate adhesive resin. The blocked amine alkoxylate does not become locked into the matrix resin, at least until relatively late in the cure process. The high molecular weight of the at least partially blocked amine alkoxylate, relative to conventional tertiary amine catalysts known in the art, may be responsible for moderating the catalyzed cure rate of the adhesive, and thereby providing a useful pot life for the adhesive system both during storage and after it is applied to the wood substrate. The high relative molecular weight also prevents the volatilization and offensive amine odors, which are characteristic of conventional (low molecular weight) tertiary amine catalysts.

The extent of blocking may vary considerably. The terminal —OH groups may be partially or fully blocked by reaction with the blocking agent. The extent of blocking is simply a matter of adjusting the stoichiometry of the reaction between the blocking agent and the amine alkoxylate. The extent of blocking should preferably be at least 25 mole percent of the available organic hydroxyl groups present in the original amine alkoxylate, more preferably at least 30 mole percent. The extent of blocking may be as high as 60 mole percent, 80 mole percent, or even 100 mole percent of the hydroxyl groups initially present in the amine alkoxylate.

The term "alkoxylated tertiary amine", when used in this document, is to be understood to denote an amine alkoxylate in which essentially all of the amine groups are tertiary. It does not imply that the initiator used to prepare the alkoxylated tertiary amine is a tertiary amine. Indeed, any amine initiator, or mixture of amine initiators, may be used as long as these amine initiators contain active hydrogen groups capable of being alkoxylated. The initiators may comprise primary, secondary, or tertiary amines, or even ammonia. The alkoxylated tertiary amine should ideally be devoid of amine groups other than tertiary amine groups when it is subjected to blocking with the monofunctional blocking agents. But, as a practical matter, there may be small amounts, up to about 10 mole percent of the total amine groups present, which may be primary and/or secondary amine groups. Preferably, these primary and/or secondary amine groups make up less than 5 mole percent of the total amine groups present in the alkoxylated tertiary amine composition, more preferably less than 2 mole percent, still more preferably less than 1 mole percent, and most preferably less than 0.5 mole percent of the total amine groups present in this composition.

It is, of course, within the scope of the invention to use mixtures of different blocking agents and/or to subject mixtures of different amine alkoxylates to blocking, if desired. It is also within the scope of the invention to use mixtures of different blocked amine alkoxylates that have been blocked with different blocking agents and/or mixtures of amine alkoxylates that have been subjected to different degrees of blocking (as a mole percentage of the —OH groups originally present), if desired. Modifications of this kind will be well appreciated by those skilled in the art.

The kinds of amine alkoxylates that may be used, in order to prepare the at least partially blocked amine alkoxylate derivatives may vary considerably. Mixtures of different amine alkoxylates may be used if desired. A particularly preferred class of amine alkoxylates are essentially free of primary or secondary amine groups. Ideally, there are no aminic N—H groups present in the amine alkoxylate. The isocyanate reactive groups present in the more preferred amine alkoxylates, prior to blocking, consist essentially of primary and/or secondary aliphatically bound hydroxyl groups. These aliphatically bound primary and/or secondary hydroxyl groups should make up at least 80 mole percent, preferably at least 90 mole percent, more preferably at least 95 mole percent, still more preferably at least 98 mole percent, yet more preferably at least 99 mole percent, and most preferably greater than 99.5 mole percent of all the isocyanate reactive functional groups present in the amine alkoxylate. Preferably, the molecular weight of the amine alkoxylate, prior to blocking, may range from 149 to 100,000, on a number averaged basis, and more preferably is in the range of from 500 to 10,000, still more preferably from 800 to 8000, even more preferably from 900 to 7000, and most preferably from 1000 to 6000, on a number averaged basis.

The number of hydroxyl groups present in the amine alkoxylate prior to blocking may range from 1 to about 20, on a number averaged basis, but is preferably in the range of from about 2 to 10, more preferably from 3 to 8, still more preferably from 3 to 6, yet more preferably from greater than 3 up to 6, and most preferably from greater than 3 up to about 4, on a number averaged basis.

Preferably, all of the amine groups present in the amine alkoxylate are tertiary amines. More preferably, all of the amine groups present in the amine alkoxylate are aliphatic tertiary amines. The number of tertiary amine groups per molecule, on a number averaged basis that are present in the amine alkoxylate are in the range of 1 to 10, but more preferably from 1 to 5, still more preferably from 2 to 5, yet more preferably 2 to 4, even more preferably 2 to 3, and most preferably about 2 (on a number averaged basis).

An especially preferred class of amine alkoxylates contain essentially only the oxyalkylene units derived from ethylene oxide and/or propylene oxide. The most preferred amine alkoxylates contain both oxyethylene and oxypropylene units and are essentially free of other kinds of oxyalkylene units. The mole percentage of oxyalkylene units derived from alkylene oxides other than ethylene oxide or propylene oxide should be less than 10 mole percent of the total number of oxyalkylene units present in the molecule, more preferably less than 5 mole percent, still more preferably less than 2 mole percent, and most preferably less than 1 mole percent, on a number averaged basis.

The most preferred amine alkoxylates suitable for preparing the at least partially blocked amine alkoxylates are those obtained by reacting ethylene diamine with both ethylene oxide and propylene oxide until all of the amine groups present in the ethylene diamine initiator have been converted into tertiary amines. In general, the preferred amine alkoxylates contain a plurality of ether groups in the molecule and are devoid of oxyalkylene groups other than oxyethylene or oxypropylene. The reaction of ethylene diamine [EDA] with the ethylene oxide [EO] and propylene oxide [PO] may be conducted in any desired order. They may also be reacted together in a single operation (randomly). These particularly preferred amine alkoxylates contain at least 1% and more preferably at least 2% up to 60% by weight of oxyethylene units, as derived from ethylene oxide, as part of their total molecular structure.

Generally, it is always desirable that the at least partially blocked amine alkoxylates contain from at least 1% up to 80%, more preferably from at least 2% up to 70%, still more preferably from at least 5% up to 65%, yet more preferably from at least 7% up to 65%, and even more preferably from at least 10% up to 60% by weight of oxyethylene units, as derived from ethylene oxide, as part of their total molecular structure. Non limiting examples of specific amine alkoxylates that are most preferred for use in preparing the at least partially blocked amine alkoxylates according to the invention include SYNPERONIC® T-304 product, available from Uniquema Division of ICI PLC and TETRONIC® T-340 product, available from BASF Corporation. Both of these products are believed to be propoxylated and ethoxylated derivatives of ethylene diamine, wherein all the amine groups present are tertiary. The two commercial products are believed to be very similar. Both are suspected to be nominally tetrols with number averaged molecular weights of about 1650. Both products are believed to contain about 40% by weight of oxyethylene units, as derived from ethylene oxide, as part of their total molecular structure.

The reaction of the blocking agent with the alkoxylated amine may be accomplished by methods well known in the art. In the preferred embodiments, phenyl isocyanate is used as the blocking agent. The phenyl isocyanate is added to the alkoxylated amine, in the desired stoichiometric ratio, at ambient temperatures (about 25° C.) with agitation. The tertiary amine groups present in the alkoxylated amine will generally catalyze the reaction of the monoisocyanate with the free hydroxyl groups present, to form urethane groups, even at these low temperatures. However, higher temperatures may be used if desired, but preferably not above about 80° C. Alternatively, it would be within the scope of the invention, although generally less convenient, to add the alkoxylated amine to the phenyl isocyanate. Solvents may also be used if desired, but these are generally not required. The preferred amine alkoxylates are liquids under ambient lab conditions and are of sufficiently low viscosity to permit agitation. One of the major advantages of using monoisocyanates as the blocking agents is due to the fact that no by-products are generated in the reaction with the alkoxylated amine. This makes the process of synthesizing the at least partially blocked alkoxylated amine a very simple matter. When using other kinds of blocking agents, such as anhydrides or esters or alkylating agents, one should most preferably provide for removal of by-products. Otherwise, these by-products may interfere with the performance of the final adhesive composition or cause other difficulties such as limited stability or offensive odors. Removal of these by-products can be very complicated and expensive.

In another embodiment, polyisocyanate wood adhesives suitable for use in cold cure applications are provided. The polyisocyanate wood adhesives contain one or more of the at least partially blocked amine alkoxylates, as defined hereinabove. In one embodiment, where the amine alkoxylate(s) are fully blocked and contain no remaining active groups of the type likely to react with the polyisocyanate under conditions of preparation or storage, the blocked alkoxylate(s) may simply be mixed into the polyisocyanate adhesive in amounts sufficient to impart the desired moisture cure properties (such as cold cure capability). In another embodiment, where the amine alkoxylate(s) comprise partially blocked alkoxylated amine species that still contain free active hydrogen groups of a type likely to react with the polyisocyanate under conditions of preparation or storage, the partially blocked alkoxylate(s) are preferably allowed to pre-react with a molar excess of the polyisocyanate. The resulting composition is a kind of isocyanate-terminated prepolymer, which preferably also contains some free unreacted (base) polyisocyanate species. Once again, the amount of the amine alkoxylate species used is selected to provide for the desired moisture cure properties (i.e. ability to cold cure).

If the amine alkoxylate contains residual organic hydroxyl groups after blocking, then it is preferable, although not absolutely essential, to allow the residual organic hydroxyl groups to react to completion with the polyisocyanates before the polyisocyanate wood adhesive is used. This is normally accomplished simply by mixing at ambient temperatures and allowing the mixture to age at ambient temperature until the free —NCO group content (percentage of free —NCO groups by weight) stabilizes. This seldom takes more than 1 to 12 hours, in the preferred embodiments (wherein the tertiary amine groups of the amine alkoxylate are aliphatic, and all the remaining OH groups present in the amine alkoxylate are primary and/or secondary aliphatic —OH groups). This prepolymerization reaction is generally aided by the tertiary amine groups present, but the reaction may take longer as the ratio of free organic —OH groups to isocyanate groups in the mixture is increased. Heating may be used to drive the reaction to completion if desired. However, temperatures above 80° C. should be avoided in order to prevent unwanted allophanate formation. Preferably, the reaction temperature for the prepolymer formation should be 60° C. or lower, still more preferably below 50° C. It is highly desirably that the prepolymerization reaction should stop at the urethane stage. Depending on the specific adhesive formulation, additional precautions may need to be taken with regard to control of reaction temperature, reaction time, and the storage conditions in order to minimize unwanted allophanate formation. Means for accomplishing this will be appreciated by those skilled in the art.

The ingredients used to prepare the polyisocyanate adhesive composition preferably comprise about 99 to about 50%, more preferably about 93 to about 60% and most preferably about 90 to about 70% by weight of the monomeric (or "base") polyisocyanate component. The remainder of the ingredients used to prepare the polyisocyanate wood adhesive composition comprise the at least partially blocked amine alkoxylate, possibly with additional optional ingredients. The at least partially blocked amine alkoxylate should preferably comprise at least 0.5% by weight, more preferably at least 1%, still more preferably at least 3%, even more preferably at least 5%, yet more preferably at least 7%, and most preferably at least 10% by weight of the polyisocyanate adhesive composition.

The term "polyisocyanate" in the context of the present invention is understood to encompass difunctional isocyanate species, higher functionality isocyanate species, and mixtures thereof. The term "base" polyisocyanate (or monomeric polyisocyanate) will be understood to refer to polyisocyanates which have not been modified by reaction with isocyanate reactive species to form prepolymers. This term does, however, encompass polyisocyanates that have been modified by various known self-condensation reactions of polyisocyanates, such as carbodiimide modification, uretonimine modification, and trimer (isocyanurate) modification, under the proviso that the modified polyisocyanate still contains free isocyanate groups available for further reaction.

Base polyisocyanates useful in the present invention as ingredients suitable for preparing the polyisocyanate adhesive composition are those having a number-average isocyanate functionality of 2.0 or greater, preferably greater than 2.1, more preferably greater than 2.3 and most preferably greater than 2.4. Useful base polyisocyanates should have a number average molecular weight of from about 100 to about 5000, preferably about 120 to about 1800, more preferably 150 to 1000, still more preferably 170 to 700, even more preferably 180 to 500, and most preferably 200 to 400. Preferably, at least 80 mole percent and more preferably greater than 95 mole percent of the isocyanate groups of the base polyisocyanate composition are bonded directly to aromatic rings.

Examples of polyisocyanates suitable for use as the base polyisocyanates for preparing the polyisocyanate adhesive compositions include aromatic polyisocyanates such as p-phenylene diisocyanate; m-phenylene diisocyanate; 2,4-toluene diisocyanate; 2,6-toluene diisocyanate; naphthalene diisocyanates; dianisidine diisocyanate; polymethylene polyphenyl polyisocyanates; 2,4'-diphenylmethane diisocyanate (2,4'-MDI); 4,4'-diphenylmethane diisocyanate (4,4'-MDI); 2,2'-diphenylmethane diisocyanate (2,2'-MDI); 3,3'-dimethyl-4,4'-biphenylenediisocyanate; mixtures of these; and the like. Polymethylene polyphenyl polyisocyanates (MDI series polyisocyanates) having number averaged functionalities of greater than 2 are an especially preferred family of aromatic polyisocyanates for use as the base polyisocyanates.

The MDI base polyisocyanates should more preferably have a combined 2,4'-MDI and 2,2'-MDI content of less than 18.0%, more preferably less than 10% and most preferably less than 5%. However, any MDI diisocyanate isomer composition is suitable for use as, or as part of, the base polyisocyanate composition.

The MDI diisocyanate isomers, mixtures of these isomers with tri and higher functionality polymethylene polyphenyl polyisocyanates, the tri or higher functionality polymethylene polyphenyl polyisocyanates themselves, and non-prepolymer derivatives of MDI series polyisocyanates (such as the carbodiimide, uretonimine, and/or isocyanurate modified derivatives) are all examples of preferred polyisocyanates for use as the base polyisocyanate in preparing the adhesive compositions.

The base polyisocyanate composition may, optionally, include minor amounts of aliphatic polyisocyanates. Suitable aliphatic polyisocyanates include isophorone diisocyanate, 1,6-hexamethylene diisocyanate, 1,4-cyclohexyl diisocyanate, saturated analogues of the above-mentioned aromatic polyisocyanates, and mixtures thereof.

The base polyisocyanate component suitable for preparing the polyisocyanate wood adhesive compositions preferably comprises a polymeric polyisocyanate, and more preferably polymeric diphenylmethane diisocyanate (polymethylene polyphenyl polyisocyanate) species of functionality 3 or greater. Commercially available polymeric polyisocyanates of the MDI series include RUBINATE® M polyisocyanate, which is commercially available from Huntsman Polyurethanes. RUBINATE® M polyisocyanate is a base polyisocyanate comprising a complex mixture of MDI diisocyanate isomers and higher functionality oligomers of the MDI series. This commercial base polyisocyanate product has a free —NCO content of about 31.5% by weight and a number averaged functionality of about 2.7.

The ingredients used to prepare the polyisocyanate wood adhesive may also optionally comprise one or more polyols. The optional polyols may comprise amine-initiated polyols (amine alkoxylates) that have not been subjected to blocking. When polyols are used in the raw material stream (ingredients), they are incorporated into the final polyisocyanate composition by prepolymerization with a molar excess of the base polyisocyanate. The prepolymer species, optional in this invention, are isocyanate terminated. The formation of isocyanate terminated prepolymers is well known in the art. The use of non-blocked polyols is not required for the production of the polyisocyanate wood adhesive compositions disclosed herein. Optional polyols, if used, may be reacted into the base polyisocyanate ingredient composition concurrently with the introduction of the at least partially blocked amine alkoxylate(s). Alternatively, the optional polyols may be reacted into the base polyisocyanate prior to the introduction of the at least partially blocked amine alkoxylate(s). The optional polyols may even be reacted into the polyisocyanate composition after the at least partially blocked amine alkoxylates have been added, although this mode of introduction is generally less desirable because it will tend to promote unwanted side reactions such as allophanate formation. Those skilled in the art will undoubtedly recognize many variations on the use of optional prepolymers in preparing the wood adhesive compositions, without deviating from the scope of the present invention.

The ingredients incorporated into the polyisocyanate wood adhesives disclosed herein may optionally include any of the known isocyanate-compatible or prepolymerizable additives known in the art, provided that the amount by weight of the at least partially blocked amine alkoxylate is present at effective levels in the final polyisocyanate wood adhesive composition. Optional additives that may be used include one or more members selected from the group consisting of wetting agents, saturated or unsaturated inert vegetable oils (which do not contain isocyanate reactive groups), particulate fillers, non-volatile inert viscosity reducing diluents (having boiling points of greater than 180° C. at 760 mmHg pressure), and inert low molecular weight cure catalysts (which are free of isocyanate-reactive active hydrogen groups). Although it is generally preferred not to use low molecular weight tertiary amine catalysts in the adhesive formulations, they may be used. A preferred optional additive, low molecular weight cure catalyst, is DMDEE (or 2,2'-dimorpholino diethyl ether). When this (or any other) optional low molecular weight tertiary amine catalyst is used at all, it is preferred to be at a concentration of less than 1% by weight of the final polyisocyanate wood adhesive composition. The use of solvents in the polyisocyanate adhesive compositions is generally undesirable, and not necessary. In particular, solvents boiling below 180° C. at 760 mmHg pressure should preferably be avoided.

The polyisocyanate wood adhesive compositions disclosed herein are preferably characterized by being liquid and storage stable at 25° C. for at least 30 days, in the absence of moisture. These liquid adhesive compositions preferably have a viscosity that remains less than 10,000 cps, more preferably less than 7000 cps, still more preferably less than 5000 cps, and most preferably less than 4000 cps, as measured at 25° C., for at least 30 days storage in the absence of moisture exposure. The polyisocyanate wood adhesive compositions preferably have a concentration of free organically bound isocyanate (—NCO) groups in the range of from 5% to 35% by weight, more preferably from 7% to 31%, still more preferably from 8% to 30%, even more preferably from 9% to 28%, and most preferably from 10% to 27% by weight.

The polyisocyanate wood adhesive compositions are cold curable. They may be cured in the presence of moisture at a temperature of about 10° C. to about the ambient temperature range (25° C., to as high as 30° C.). A more preferred cold cure temperature range is from 20° C. to 27° C. However, it is within the scope of the invention to hot cure these adhesives, if desired, at temperatures greater than 30° C. The ability to cold cure is a major advantage. Generally, the preferred systems will cure at ambient temperature in the presence of moisture in 10 minutes to about 2 hours. Cure time may generally be reduced by increasing the tertiary amine content in the formulation, which is preferably done by raising the level of the at least partially blocked amine alkoxylate ingredient.

The adhesive compositions are preferably used as one-component adhesives that cure in the presence of moisture. However, it is within the scope of the invention, although less preferred, to use these compositions as the polyisocyanate part of a multicomponent mixing activated adhesive system.

The polyisocyanate adhesive compositions may be used to bond many different types of moisture-containing substrates. Preferably, the compositions are used to bond multiple wood substrates together to prepare engineered lumber products. It is preferred that at least one of the substrates be selected from the group consisting of wood, paper, rice hulls, cement, stone, cloth, grass, corn husks, bagasse, nut shells, polymeric foam films and sheets, polymeric foams and fibrous materials. Wood substrates are most preferred. Preferably, the compositions are used to fabricate multi-substrate composites or laminates, particularly those comprising lignocellulosic or cellulosic materials, such as wood or paper, to prepare products such as plywood, laminated veneer lumber, waferboard (also known as chipboard or OSB), particleboard, fiberboard, composite wooden I-beams (I-joists), and the like.

In the process disclosed herein for using the polyisocyanate wood adhesives, the adhesive compositions are moisture cured. It is important that the substrates have a reasonably high moisture content. Specifically, the substrates should have a moisture content of at least about 5% by weight, more preferably at least about 6% by weight, and even more preferably about 7% by weight or higher. Even more preferably, the substrates have a moisture content of about 10 to 20% by weight, and most preferably from about 12% to 15% by weight.

The invention further pertains to a process for bonding substrates together by using the adhesive composition, as previously described. The most preferred substrates are wood substrates. The adhesive composition is preferably applied to a surface of a first substrate. A surface of a second substrate is then contacted with the surface of the first substrate containing the adhesive composition. Pressure is then applied to the contacted surfaces and the adhesive composition is allow to cure. The surface of the second substrate, against which the first substrate is contacted, is generally not coated with the polyisocyanate adhesive composition. However, that (second) surface may also be coated prior to contacting the substrates, if desired.

The polyisocyanate adhesive compositions can be applied to the surfaces of substrates in any conventional manner. For example, the surface may be coated with the composition by spraying, brushing, doctor blading, wiping, dipping, pouring, ribbon coating, combinations of these different methods, and the like. Suitable means for applying the adhesive compositions to the surface of the substrate for a particular end use application will be evident to one skilled in the art from the present disclosure.

After the adhesive coated substrates are contacted with each other, pressure is applied thereto. The pressure should be sufficient to cause the surfaces to adhere to one another. Generally, the amount of pressure and the time period for which the pressure is applied are not limited and specific pressures and times will be evident to one skilled in the art from the present disclosure. However, it has been found preferable that a pressure of approximately 10 to 200 psi be applied for about 10 minutes to about 2 hours, more preferably from about 10 minutes to 20 minutes, to cause appropriate adhesion for most substrates (pressed at 25° C.). Further processing can generally be conducted on the treated (pressure adhered) substrates within about one hour.

Regardless of the manner of application, the total amount of the adhesive composition applied to the adhesive bond between two substrates may vary considerably from one end use application, or type of substrate, to the next. The amount of adhesive should be sufficient to achieve the desired bond strength and bond durability under a given set of test conditions. This often must be optimized for any given situation, as will be evident to those skilled in the art. It is generally undesirable for economic reasons to use more adhesive than is required to achieve a given bond strength and a given degree of bond durability. Use of excessive amounts of adhesive may also result in slower cure. However, it has been found preferable to use an amount of the polyisocyanate adhesive composition in the range of from about 10 to about 40, more preferably from 10 to 30 grams per square foot of bond surface area (i.e. the bond surface area being the area of overlap between the substrates to be bonded by the adhesive composition). The invention still further pertains to adhesive bonded wood composite articles prepared by using the polyisocyanate adhesive compositions disclosed herein.

One of the major advantages of the adhesive compositions disclosed herein is the dramatic improvement in resistance to delamination that they provide in adhesive laminated wood composite articles. These improvements are quite large in relation to the prior art adhesive compositions.

A particularly demanding test for delamination resistance is provided in the method of ASTM D-2559-00 Section 1.2.2 [Resistance to Delamination During Accelerated Exposure to Wetting and Drying], which is herein incorporated fully by reference. Laminated wood composites prepared from the preferred polyisocyanate adhesive compositions, in the preferred amounts and under the preferred processing conditions, as disclosed herein, preferably have total delamination results according to the delamination test method of ASTM D-2559-00 Section 15.4.1 of less than 5%, more preferably less than 3%, still more preferably less than 2%, and most preferably less than 1%.

In addition to their most preferred use in one-component moisture cured polyisocyanate wood adhesives, the preferred at least partially blocked, oxyethylene containing, aliphatic amine alkoxylates may be useful in other applications of polyurethanes technology which require a catalytic species that is both stable in polyisocyanates and has a mild catalytic activity.

In this specification all molecular weights, equivalent weights, and group functionalities of polymeric species are to be understood as number average unless otherwise indicated. Likewise all molecular weights, equivalent weights, and group functionalities of pure compounds are to be understood as absolute unless otherwise indicated.

The invention is further illustrated by the following non-limiting examples, and all percentages are by weight unless otherwise indicated.

EXAMPLES

Glossary:

1. RUBINATE®-1850 polyisocyanate: Is an isocyanurate modified (partially trimerized) derivative of polymeric MDI, available commercially from Huntsman Polyurethanes. This product has a free isocyanate group content of about 31% by weight. It is a liquid at 25° C. having a viscosity at that temperature of about 700 cps. This product contains no prepolymers.

2. SYNPERONIC® T-304 product: Is an ethoxylated and propoxylated derivative of ethylene diamine [EDA] in which the amine groups are all tertiary aliphatic amines and the content of oxyethylene units is about 40% by weight. This product is a nominal tetrol, obtained from the Uniquema Division of ICI PLC, and has a number averaged molecular weight of about 1650.

3. TETRONIC® T-304 product: Is believed to be chemically equivalent to SYNPERONIC® T-304 product. This product is commercially available from BASF Corporation.

4. LINESTAR®-4800 polyisocyanate [cited below as LS4800]: Is a cold curing polyisocyanate wood adhesive of a type known in the prior art. This product is a prepolymer derived from a mixture of diphenylmethane diisocyanate isomers and higher oligomers of the MDI series. The prepolymer is formed from a combination of an EDA initiated polyether tetrol and a polyoxypropylene diol. This commercial product, available from Huntsman Polyurethanes, is a liquid that has a free isocyanate [—NCO] group content of about 19% by weight and a viscosity at 25° C. of about 3500 cps. The product is designed for use as a single component moisture curing wood adhesive.

Example 1

Preparation of a phenyl isocyanate endcapped T-304

This example shows the preparation of an at least partially blocked derivative of an amine alkoxylate. The amine alkoxylate used was TETRONIC®) T-304 product and the monofunctional blocking agent was phenyl isocyanate.

Samples of TETRONIC® T-304 product were obtained from BASF Corporation. This material has the following properties: number average MW=1650; nominal hydroxyl functionality 4 (nominal functionality being the active hydrogen functionality of the initiator, in this case ethylene diamine); and number average equivalent weight =412.5. The nominal hydroxyl functionality is a very close approximation to the number averaged hydroxyl functionality of this system. It is believed that all the amine groups in T-304 are tertiary amine groups. Phenyl isocyanate was obtained from the Aldrich Chemical Co. This material has the following properties: molecular weight (absolute)=119.12; isocyanate functionality (absolute)

1. Density =1.096. Both reagents were used as received.

Into a glass jar was weighed 10 g of T-304. A gentle purge of dry nitrogen was used above the jar to avoid the absorption of excess moisture by the T-304. The temperature of the T-304 was about 25° C. (ambient laboratory conditions). Phenyl isocyanate was weighed into a 10 cc plastic syringe, by pre-weighing the syringe, then drawing a volume of the phenyl isocyanate into the syringe and re-weighing. Nine (9) grams of phenyl isocyanate were taken up into the syringe. This amount of the phenyl isocyanate is sufficient to react about 30 mole percent of the hydroxyl groups on the T-304. The 9 g of phenyl isocyanate was slowly added to the T-304 while stirring, at about 25° C. After the phenyl isocyanate was added, stirring was continued for about 15 min. The jar was then sealed with a metal cap under dry nitrogen, and placed in an oven at 60° C. for three hours. During this three hour period the sample was occasionally taken from the oven and shaken. After the three hours heating, the sample was removed from the oven and allowed to equilibrate to ambient laboratory temperature overnight.

Example 2

Use of the phenyl isocyanate endcapped T-304, as prepared in Example-1, in one-component polyisocyanate wood adhesives under cold cure conditions A series of polyisocyanate adhesive formulations were prepared using the phenyl isocyanate endcapped T-304 (according to the invention). These samples were compared to LS-4800 as a control, which embodies the technology disclosed in U.S. Pat. No. 6,368,714. The polyisocyanate adhesives containing the phenyl isocyanate endcapped T-304 were prepared by blending the indicated polyisocyanate product with the indicated amounts of the P.I. endcapped T-304 at ambient lab temperature (about 25° C.) and allowing the reaction of any free —OH groups on the endcapped T-304 to react over a period of about 24 hours.

Laminated wood composite test samples were prepared, and tested according to ASTM D-2559-00 Sections 10 and 11. The wood used in these studies was Southern Yellow Pine which was cut to 6' ×12' ×¾" dimensions, sanded, surface treated with a 1% (by weight) aqueous urea solution, and conditioned at 45% RH, 38 DC for at least 24 hours to provide a moisture content of 8–9 % by weight. Approximately 8 grams of the indicated adhesive composition in each test series was applied to the top surface of the conditioned urea pretreated wood specimens, and a 6 layer, 5 bondline laminate sample were pressed in a laboratory press at a pressure of 250 psi for 60 minutes at 25° C. for each type of adhesive used in the study. The adhesive was applied by brushing, and was applied only to one side of each bond interface. The laminated were formed from the coated test specimens and pressed within 5 minutes of the application of the adhesive.

Each laminate was cut as shown in the cutting diagram below. Two test specimens from each laminate were tested according to the procedure outlined in ASTM Specification D 2559-00 Section 15 [Resistance to Delamination During Accelerated Exposure]. The data in the tables is an average of two samples.

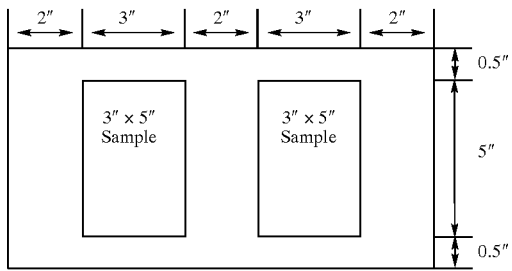

The results of the cyclic delamination testing are provided in the tables below, for each adhesive type.

| LS-4800 Control | |
|---|---|
| Bondline | % Delamination |
| 1 | 0.0 |
| 2 | 6.5 |
| 3 | 22.5 |
| 4 | 9.5 |
| 5 | 1.5 |
| Total Delamination | 8.0 |

| 90% LS-4800 + 10% Phenylisocyanate Endcapped T-304 | |
|---|---|
| Bondline | % Delamination |
| 1 | 0.0 |
| 2 | 0.0 |
| 3 | 1.5 |
| 4 | 0.0 |
| 5 | 0.0 |
| Total Delamination | 0.3 |

| 70% RUBINATE ®-1850 isocyanate/30% Phenylisocyanate Endcapped T-304 | |
|---|---|
| Bondline | % Delamination |
| 1 | 2.3 |
| 2 | 1.1 |
| 3 | 0.0 |
| 4 | 3.1 |
| 5 | 0.0 |
| Total Delamination | 1.3 |

The data shows a significant decrease in the total percent delamination attained for both adhesive samples according to the invention that incorporated the phenyl isocyanate endcapped T-304 material. Also shown are large decreases in percent delamination at most of the individual bond interfaces in the samples prepared from the adhesive compositions according to the invention. Even a simplified adhesive formulation consisting of RUBINATE®1850 polyisocyanate combined with the phenyl isocyanate endcapped t-304 performed significantly better than the control (LS-4800).

What is claimed is:

1. A moisture-activated adhesive composition comprising the reaction product of: (i) the reaction product of a hydroxyl terminated alkoxylated tertiary amine and at least one monofunctional organic blocking agent, wherein free hydroxyl groups initially present in the hydroxyl terminated alkoxylated tertiary amine are at least partially blocked, and (ii) a polyisocyanate.

2. The moisture-activated adhesive composition of claim 1, wherein the hydroxyl terminated alkoxylated tertiary amine comprises an ethoxylated and propoxylated derivative of ammonia or an aliphatic amine bearing active hydrogen groups.

3. The moisture-activated adhesive composition of claim 1, wherein the hydroxyl terminated alkoxylated tertiary amine has a number averaged molecular weight of at least 500.

4. The moisture-activated adhesive composition of claim 1, wherein the hydroxyl terminated alkoxylated tertiary amine comprises between one to ten aliphatic tertiary amine groups per molecule, on a number averaged basis.

5. The moisture-activated adhesive composition of claim 1, wherein the hydroxyl terminated alkoxylated tertiary amine comprises the reaction product of ethylene diamine with ethylene oxide and propylene oxide, wherein all amine groups in the ethylene diamine have been converted into tertiary amines in the reaction product.

6. The moisture-activated adhesive composition of claim 1, wherein the hydroxyl terminated alkoxylated tertiary amine comprises from 2 to 60% by weight of oxyethylene units, relative to the weight of the hydroxyl terminated alkoxylated tertiary amine.

7. The moisture-activated adhesive composition of claim 1, wherein at least 30 mole percent of the free hydroxyl groups initially present in the hydroxyl terminated alkoxylated tertiary amine have been converted into urethane groups.

8. The moisture-activated adhesive composition of claim 1 comprising about 70% to about 90% by weight of the polyisocyanate.

9. The moisture-activated adhesive composition of claim 1 comprising at least 10% by weight of the reaction product of the hydroxyl terminated alkoxylated tertiary amine and the at least one monofunctional organic blocking agent.

10. The moisture-activated adhesive composition of claim 1, wherein the monofunctional organic blocking agent comprises phenyl isocyanate.

11. A moisture-activated adhesive composition comprising the reaction product of: (i) the reaction product of a hydroxyl terminated alkoxylated tertiary amine and a blocking agent comprising phenyl isocyanate, wherein at least 25 mole percent of free hydroxyl groups initially present in the hydroxyl terminated alkoxylated tertiary amine are blocked, and (ii) a polyisocyanate.

12. The moisture-activated adhesive composition of claim 11 comprising about 70% to about 90% by weight of the polyisocyanate.

13. The moisture-activated adhesive composition of claim 12 comprising at least 10% by weight of the reaction product of the hydroxyl terminated alkoxylated tertiary amine and the blocking agent.

14. A process for bonding multiple lignocellulosic or cellulosic substrates comprising the steps of:
   a. applying to a surface of a first substrate the moisture-activated adhesive composition of claim 1;
   b. contacting the surface of the first substrate with a surface of a second substrate at a temperature in the range of from 10° C. to 30° C.; and c. applying pressure to the contacted surfaces for a length of time sufficient to achieve an adhesive bond between the contacted surfaces.

15. A process for bonding multiple lignocellulosic or cellulosic substrates comprising the steps of:
   a. applying to a surface of a first substrate the moisture-activated adhesive composition of claim 11;
   b. contacting the surface of the first substrate with a surface of a second substrate at a temperature in the range of from 10° C. to 30° C.; and
   c. applying pressure to the contacted surfaces for a length of time sufficient to achieve an adhesive bond between the contacted surfaces.

16. A composite article comprising a first substrate and a second substrate bonded with the moisture-activated adhesive composition of claim 1.

17. A composite article comprising a first substrate and a second substrate bonded with the moisture-activated adhesive composition of claim 11.

18. The composite article of claim 16 comprising a total delamination value of less than 2% as measured according to the cyclic delamination test procedure of ASTM D-2559-00 Section 15.4.1.

19. The composite article of claim 17 comprising a total delamination value of less than 2% as measured according to the cyclic delamination test procedure of ASTM D-2559-00 Section 15.4.1.

20. A catalyst for use in polyisocyanate-based adhesives comprising the reaction product of a hydroxyl terminated alkoxylated tertiary amine and at least one monofunctional organic blocking agent wherein free hydroxyl groups initially present in the hydroxyl terminated alkoxylated tertiary amine are at least partially blocked, and wherein the hydroxyl terminated alkoxylated tertiary amine comprises the reaction product of ethylene diamine with ethylene oxide and propylene oxide, wherein all amine groups in the ethylene diamine have been converted into tertiary amines in the reaction product.

* * * * *